United States Patent [19]
Betensky

[11] 3,961,844
[45] June 8, 1976

[54] LENS

[75] Inventor: Ellis I. Betensky, Toronto, Canada

[73] Assignee: Optigon Research & Development Corporation, Santa Monica, Calif.

[22] Filed: Apr. 12, 1974

[21] Appl. No.: 460,342

Related U.S. Application Data

[63] Continuation-in-part of Ser. No. 337,213, March 1, 1973, abandoned.

[52] U.S. Cl. ........................... 350/175 FS; 350/220
[51] Int. Cl.² ...................... G02B 3/00; G02B 9/34
[58] Field of Search ...................... 350/220, 175 FS

[56] References Cited
UNITED STATES PATENTS 3,429,997  2/1969  Rosner et al. ............... 350/175 FS
3,516,735  6/1970  Goodell ........................... 350/220

*Primary Examiner*—John K. Corbin
*Assistant Examiner*—Conrad Clark
*Attorney, Agent, or Firm*—DeLio and Montgomery

[57] ABSTRACT

A lens for a small film format still camera which comprises four lens elements disposed behind the aperture defining means, and includes a double convex convergent lens element, a second double concave divergent lens element, a third double convex convergent element, and a fourth concave-plano lens element.

1 Claim, 4 Drawing Figures

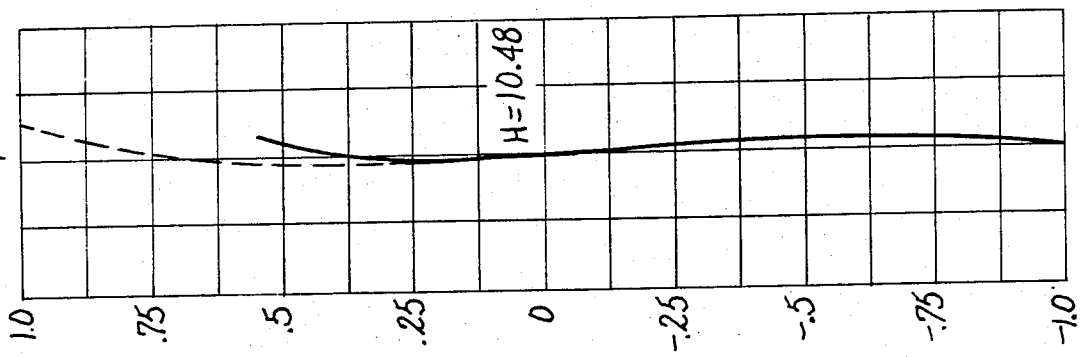
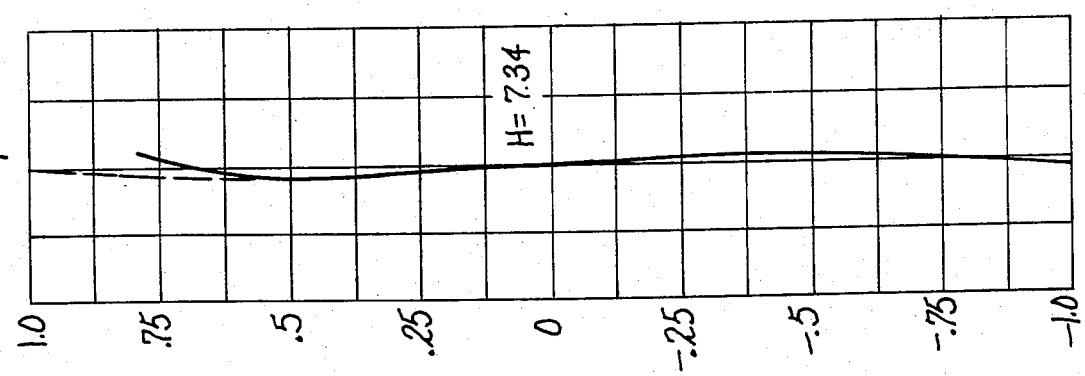
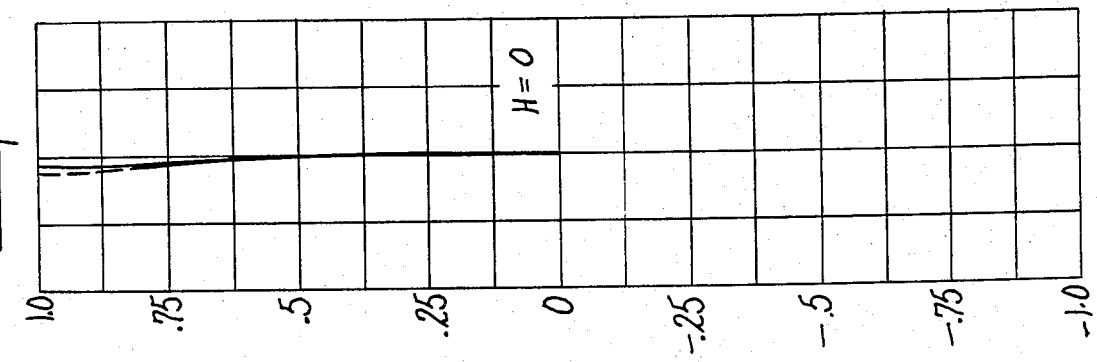

LENS

This application is a continuation-in-part of application Ser. No. 337,213 filed Mar. 1, 1973 now abandoned.

This invention relates to lenses and more particularly relates to lenses for small image frame still cameras.

The invention provides a lens designed for a small film format and particularly those where the ratio of the equivalent focal length to the diagonal of the film plane is 1.3 or less. A lens embodying the invention is particularly useful for cameras having substantially a 17 × 13mm image frame.

The lens may be utilized at a first aperture stop for existing light photographs and a second aperture stop to give a fixed depth of field when used with artificial light, such as an electronic flash.

To obtain high quality pictures with a maximum depth of field even for the small format cameras a lens of surprisingly high quality is required. The reason for this high quality is, of course, that a large blowup is required to provide a good print size. In such lenses, the lens should really be film limited and not optically limited if a good twenty-fold enlargement is to be provided.

Additionally, such small cameras must be manufactured at a cost which will induce high volume purchasing, and hence production.

Such lenses require a short equivalent focal length to maximize the depth of field. However, lenses which have a relatively wide field angle present problems of field curvature. In order to cover a wide field angle on the order of a 24° field half angle or greater the Petzval sum must be small, or objectionable field curvature will result. One technique of reducing the Petzval sum is to use a triplet lens with the positive and negative elements separated by a large air space. However, minimization of the Petzval sum of a triplet lens is not sufficient to achieve wide angle coverage because the usual high power of the negative element causes almost total internal reflection at wider field angles.

The present invention overcomes this problem in use of the triplet form for wide angle application by limiting the absolute value of the power of the negative element to a predetermined value and, also the sum of the powers of the positive values, as well as the absolute value of the sum of the element powers. Additionally, a field flattening element is disposed behind the triplet. The provision of the field flattener aids in the elimination of high refractive index glass with high Abbe numbers, resulting in a less costly lens of high resolving power.

Both the high quality and low cost parameters can be met through the provision of a lens disposed totally behind the aperture stop and utilizing a field flattener, preferably of acrylic, where the first lens element is slightly convergent with a second divergent element closely spaced thereto followed by a third convergent lens and then spaced a substantial distance from said three lens elements is a field flattening element which provides extremely high offaxis resolution. This provides a lens design which may utilize an inexpensive flint glass in the first two lens elements.

The desired lens may be provided using a triplet form followed by a field flattener and meeting certain discovered parameters. The absolute value of the element powers is .01 or less, and the absolute value of the negative element of the triplet is 0.12 or less for a combined lens. Additionally, the sum of the positive elements is 0.16 or less. With these parameters, the Petzval sum is controlled and the desired wide angle obtained.

An object of this invention is to provide a new and improved lens for a small image frame camera.

Another object of this invention is to provide a lens for such a frame size which provides high resolution throughout the film frame, yet is economical in cost.

A further object of this invention is to provide such a lens which may utilize the triplet form.

The features of the invention which are believed to be novel are particularly pointed out and distinctly claimed in the concluding portion of this specification. However, the invention together with further objects and advantages thereof may best be appreciated by reference to the following detailed description taken in conjunction with the drawing, wherein:

FIGS. 2a, 2b and 2c are curves showing the lateral aberration of the lens of FIG. 1.

Figure 1:
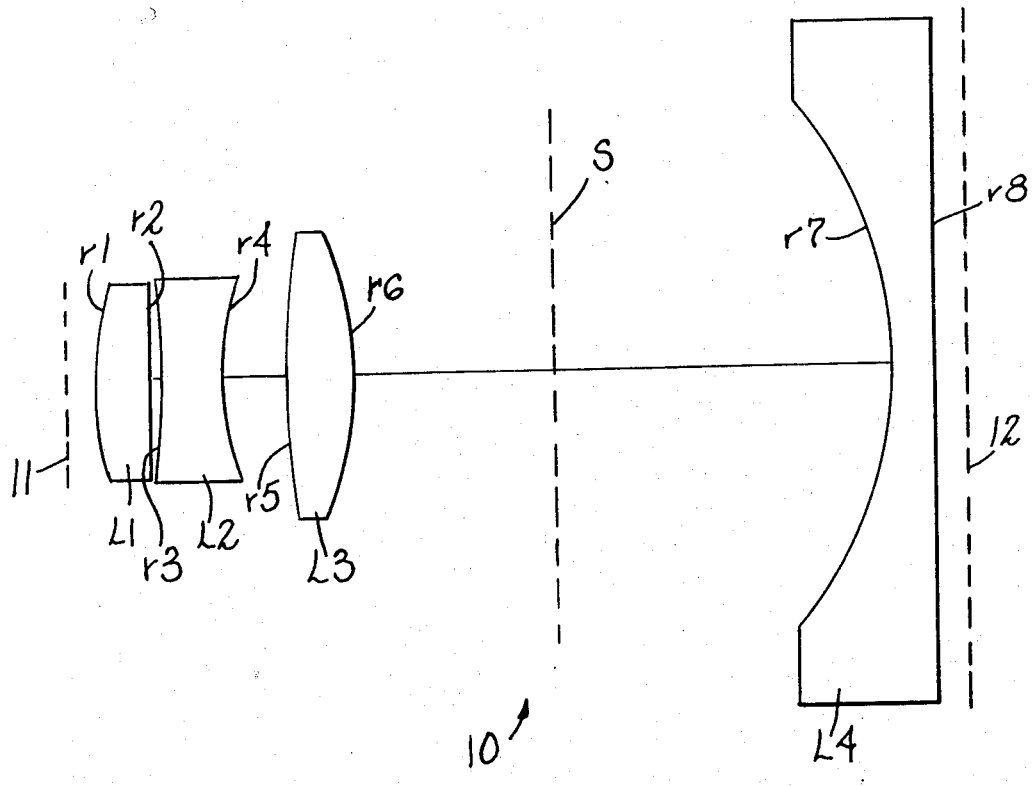
FIG. 1 is a view of a lens embodying the invention.

A lens 10 embodying the invention comprises a first convex-concave convergent element L1 disposed behind the aperture stop mechanism 11. Element L2 is a double convex divergent element followed by a double concave convergent element L3. Elements L1 and L2 may be made from relatively inexpensive flint optical glass while the third element is a moderately priced lanthanum crown. A fourth element L4, a concave-plano field flattener is preferably molded of acrylic and is disposed in front of the film plane 12. The shutter S is disposed between elements L3 and L4.

The lens is designed to provide a field of focus of three feet to infinity at a relative aperture of f/11, and a field of focus of four and one-half feet to ten feet at an aperture stop of f/4.0, with an effective focal length (EFL) of 23.5mm.

The mechanism defining the aperture stop 11 is arranged to open to f/4.0 when the camera is placed in a flash mode and stop down to f/11 when in a natural light mode.

The powers of the lenses are as follows:

TABLE I

| Lens | Power(K) |
| --- | --- |
| L1 | .0787 |
| L2 | −.1167 |
| L3 | .0713 |
| L4 | −.0357 |

The algebraic sum of the lens powers is only 0.0024, and in this lens is negative.

The lens is further defined by the data of Table II.

TABLE II

| Lens | Radius | Lens Thickness or Air Space Distance | $N_d$ | $V_d$ | Clear Aperture |
| --- | --- | --- | --- | --- | --- |
| Aperture | | | | | 5.98mm |
| | | 0.98mm | | | |

TABLE II-continued

| Lens | Radius | | Lens Thickness or Air Space Distance | $N_d$ | $V_d$ | Clear Aperture |
|------|--------|---|-------------------------------------|-------|-------|----------------|
| L1   | r1     | 10.05mm   |       |       |       | 6.0            |
|      |        |           | 2.08  | 1.694 | 30.9  |                |
|      | r2     | −66.137   |       |       |       | 5.8            |
|      |        |           | .23   |       |       |                |
|      | r3     | −20.40    |       |       |       | 5.8            |
| L2   |        |           | 2.00  | 1.792 | 25.5  |                |
|      | r4     | 10.616    |       |       |       | 6.3            |
|      |        |           | 2.095 |       |       |                |
|      | r5     | 27.597    |       |       |       | 8.3            |
| L3   |        |           | 2.15  | 1.643 | 59.9  |                |
|      | r6     | −12.989   |       |       |       | 8.9            |
|      |        |           | 18.02 |       |       |                |
|      | r7     | −13.755   |       |       |       | 16.7           |
| L4   |        |           | 1.50  | 1.491 | 58.4  |                |
|      | r8     | Plano     |       |       |       | 20.2           |

Back Focal Length = 1.0
Where $N_d$ is the index of refraction, and $V_d$ is the Abbe Number.

The field flattening element L4 is spaced from the elements L1, L2, and L3, and surface r6, a distance greater than the distance between surfaces r1 and r6.

The acrylic field flattener has only two aberrations, field curvature and distortion. The three element lens combination can thus be tested as a unit without use of the field flattening element. The lateral Petzval sum of the four lens surfaces is 0.029.

FIGS. 2a, 2b, and 2c exemplify the minimal lateral aberration present in the lens for radial distances H (or image light) on a 13 × 17 millimeter image frame as measured from the axis of the lens. In FIGS. 2a – 2c, each abscissa division shown represents 0.05mm. The ordinates are the relative entrant pupil height of the lens from 0 – 100% at a relative aperture of f/4.0. The sagittal rays are shown in broken line, and the tangential in full line.

The disclosed lens meets the following parameters:

$\Sigma |K_{1-4}| \leq 0.01$
$|K_2| \leq .12$
$K_1 + K_3 \leq .16$
$EFL/D \leq 1.3$ Where $K_1 - K_4$ represents the lens powers of lens elements L1 – L4, respectively. EFL is the equivalent focal length, and D is the diagonal of the image frame.

The disclosed lens is scaled to an EFL of 23.5mm for a diagonal D of 21.4mm.

The single most important parameter to hold down the power of the second element to eliminate the internal reflection that would occur for wide field angle achieved.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens having characteristics substantially as follows as scaled to a 23.5mm equivalent focal length:

| Lens | Radius | | Lens Thickness or air Space Distance | $N_d$ | $V_d$ |
|------|--------|---|-------------------------------------|-------|-------|
| L1   | r1     | 10.05mm   |         |       |      |
|      |        |           | 2.08mm  | 1.694 | 30.9 |
|      | r2     | −66.137   |         |       |      |
|      |        |           | .23     |       |      |
|      | r3     | −20.40    |         |       |      |
| L2   |        |           | 2.00    | 1.792 | 25.5 |
|      | r4     | 10.616    |         |       |      |
|      |        |           | 2.095   |       |      |
|      | r5     | 27.597    |         |       |      |
| L3   |        |           | 2.15    | 1.643 | 59.9 |
|      | r6     | −12.989   |         |       |      |
|      |        |           | 18.02   |       |      |
|      | r7     | −13.755   |         |       |      |
| L4   |        |           | 1.50    | 1.491 | 58.4 |
|      | r8     | Plano     |         |       |      |
|      |        |           | 1.0     |       |      |

Film Plane
Where $N_d$ is the index of refraction, $V_d$ is the Abbe number and L1 – L4 are lens elements from the object end.

* * * * *

UNITED STATES PATENT AND TRADEMARK OFFICE
CERTIFICATE OF CORRECTION

PATENT NO. : 3,961,844
DATED : June 8, 1976
INVENTOR(S) : Ellis I. Betensky

It is certified that error appears in the above-identified patent and that said Letters Patent are hereby corrected as shown below:

Column 1, line 1, before "application" second occurrence, insert --copending--. Column 1, line 61, "offaxis" should read --off-axis--. Column 2, line 8, after "lens" insert --EFL of 23.5--. Column 2, line 31, change "convex-concave" to --double-convex--. Column 2, line 33, change "convex" to --concave--.

Signed and Sealed this

Fourteenth Day of September 1976

[SEAL]

Attest:

RUTH C. MASON
*Attesting Officer*

C. MARSHALL DANN
*Commissioner of Patents and Trademarks*